(12) United States Patent
Lee et al.

(10) Patent No.: US 12,551,440 B2
(45) Date of Patent: Feb. 17, 2026

(54) KIT FOR PREPARING NANOPARTICLE COMPOSITION FOR DRUG DELIVERY

(71) Applicant: SAMYANG HOLDINGS CORPORATION, Seoul (KR)

(72) Inventors: So Jin Lee, Seoul (KR); Sang Hoon Kim, Yongin-si (KR); Joon Young Park, Seoul (KR); Hye Yeong Nam, Seongnam-si (KR); Ji Yeon Son, Daejeon (KR)

(73) Assignee: SAMYANG HOLDINGS CORPORATION, Seoul (KR)

( * ) Notice: Subject to any disclaimer, the term of this patent is extended or adjusted under 35 U.S.C. 154(b) by 786 days.

(21) Appl. No.: 17/778,655

(22) PCT Filed: Nov. 19, 2020

(86) PCT No.: PCT/KR2020/016359
§ 371 (c)(1),
(2) Date: May 20, 2022

(87) PCT Pub. No.: WO2021/101265
PCT Pub. Date: May 27, 2021

(65) Prior Publication Data
US 2023/0017360 A1    Jan. 19, 2023

(30) Foreign Application Priority Data
Nov. 22, 2019    (KR) ........................ 10-2019-0151227

(51) Int. Cl.
*A61K 9/16*      (2006.01)
*A61K 31/7105*   (2006.01)
*A61K 35/768*    (2015.01)

(52) U.S. Cl.
CPC .......... *A61K 9/1647* (2013.01); *A61K 9/1617* (2013.01); *A61K 31/7105* (2013.01); *A61K 35/768* (2013.01)

(58) Field of Classification Search
CPC ................ A61K 9/1647; A61K 9/1617; A61K 31/7105; A61K 35/768; A61K 35/76
See application file for complete search history.

(56) References Cited

U.S. PATENT DOCUMENTS 5,552,157 A    9/1996   Yagi et al.
5,976,567 A    11/1999  Wheeler et al.
(Continued)

FOREIGN PATENT DOCUMENTS

CN    102727907 A    10/2012
CN    108366964 A     8/2018
(Continued)

OTHER PUBLICATIONS

Extended European Search Report for European Application No. 20891247.7, dated Dec. 22, 2023.
(Continued)

*Primary Examiner* — David W Berke-Schlessel
*Assistant Examiner* — Trent R Clarke
(74) *Attorney, Agent, or Firm* — Birch, Stewart, Kolasch & Birch, LLP

(57) ABSTRACT

The present invention relates to a kit for preparing a nanoparticle composition for drug delivery and, more specifically, to a kit for preparing a nanoparticle composition for drug wherein the kit is designed such that the kit does not comprise a polylactic acid salt and nanoparticles containing a drug encapsulated therein can be easily formed just by simply mixing an amphiphilic block copolymer, a cationic compound, and a drug as components of the kit.

5 Claims, 2 Drawing Sheets

(56) References Cited

U.S. PATENT DOCUMENTS

| | | |
|---|---|---|
| 6,117,433 A | 9/2000 | Edens et al. |
| 6,235,310 B1 | 5/2001 | Wang et al. |
| 2007/0148250 A1 | 6/2007 | Haas et al. |
| 2015/0328182 A1 | 11/2015 | La et al. |
| 2016/0228361 A1 | 8/2016 | Kim et al. |
| 2018/0250409 A1 | 9/2018 | Nam et al. |
| 2018/0344638 A1 | 12/2018 | Nam et al. |
| 2020/0060981 A1 | 2/2020 | Betbeder et al. |

FOREIGN PATENT DOCUMENTS

| | | | |
|---|---|---|---|
| EP | 3 391 875 A1 | 10/2018 | |
| JP | 2014-502615 A | 2/2014 | |
| KR | 10-2003-0020390 A | 3/2003 | |
| KR | 10-0517060 B1 | 5/2006 | |
| KR | 10-2011-0077818 A | 7/2011 | |
| KR | 10-2018-0008864 A | 1/2018 | |
| KR | 10-2019-0127277 A | 11/2019 | |
| KR | 10-2013-0112794 A | 10/2025 | |
| WO | WO 93/15726 A1 | 8/1993 | |
| WO | WO 2012/091523 A2 | 7/2012 | |
| WO | WO-2017048018 A1 * | 3/2017 | ......... A61K 31/7088 |
| WO | WO 2017/105138 A1 | 6/2017 | |
| WO | WO 2018/124423 A1 | 7/2018 | |

OTHER PUBLICATIONS

Amani et al., "Preparation and Characterization of PLA-PEG-PLA/PEI/DNA Nanoparticles for Improvement of Transfection Efficiency and Controlled Release of DNA in Gene Delivery System." Iranian Journal of Pharmaceutical Research, vol. 18, No. 1. Apr. 2018, pp. 125-141 (21 pages total).

Gary et al., "Polymer-Based siRNA Delivery: Perspectives on the Fundamental and Phenomenological Distinctions from Polymer-Based DNA Delivery", Journal of Controlled Release, vol. 121, 2007, pp. 64-73.

International Search Report (PCT/ISA/210) issued in PCT/KR2020/016359 mailed on Feb. 25, 2021.

* cited by examiner

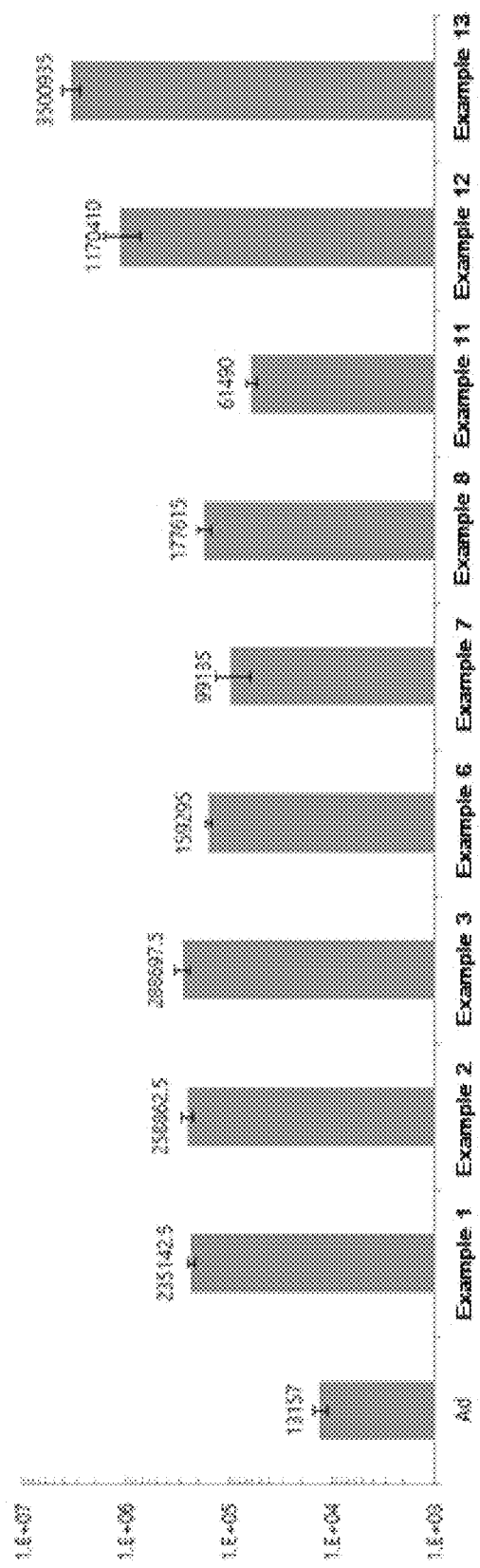
[FIGURE 1]

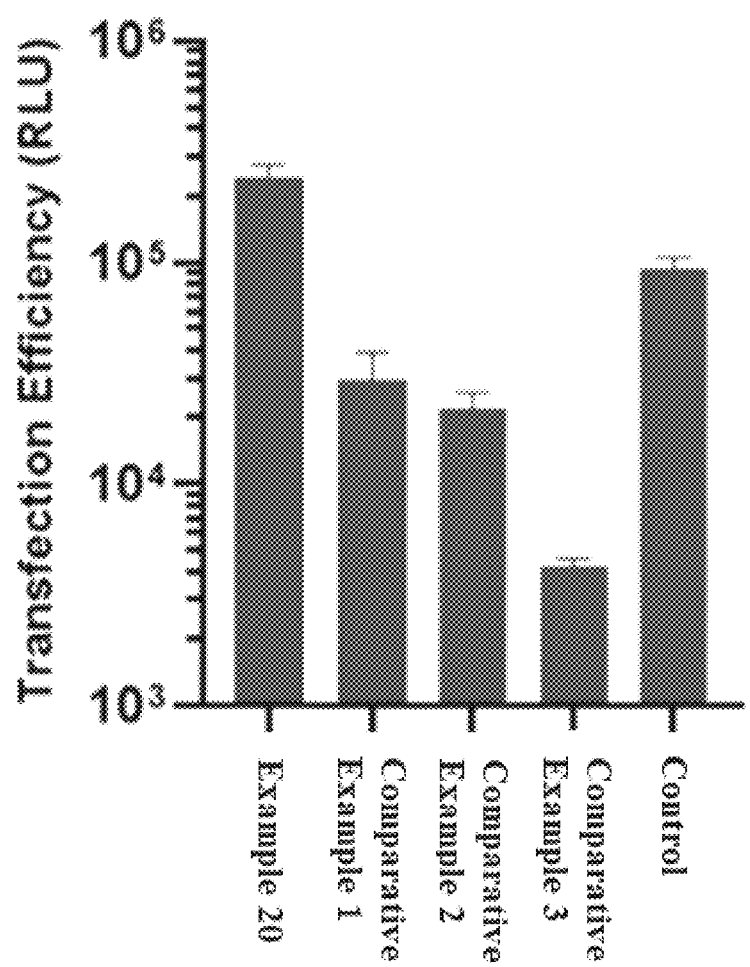
[FIGURE 2]

KIT FOR PREPARING NANOPARTICLE COMPOSITION FOR DRUG DELIVERY

TECHNICAL FIELD

This disclosure relates to a kit for preparing a nanoparticle composition for drug delivery, and more specifically, a kit for preparing a nanoparticle composition for drug delivery which does not contain a salt of polylactic acid and is designed to easily form nanoparticles in which a drug is encapsulated therein by simply mixing the amphiphilic block copolymer, cationic compound and drug which are kit components.

BACKGROUND ART

Safe and efficient drug delivery technologies have been studied for a long time for treatment using anionic drugs including nucleic acid, and various delivery systems and delivery technologies have been developed. The delivery systems are largely divided into a viral delivery system using adenovirus or retrovirus, etc. and a non-viral delivery system using cationic lipids and cationic polymers. A technology using a viral delivery system is exposed to risks such as non-specific immune reaction, etc. and it is known to have many problems in commercialization due to the complex production process. Therefore, recent studies have progressed toward a non-viral delivery system to overcome these disadvantages. Compared to the viral delivery system, the non-viral delivery system has the advantages of fewer side effects in terms of in vivo safety and a low production price in terms of economic feasibility.

Most representative examples of a non-viral delivery system used for delivery of nucleic acid include a complex of cationic lipid and nucleic acid (lipoplex) and a complex of a polycationic polymer and nucleic acid (polyplex). Many studies on cationic lipids or polycationic polymers have been made because they stabilize anionic drugs by forming a complex by electrostatic interactions with the anionic drug, and facilitate delivery into cells (De Paula D, Bentley M V, Mahato R I, Hydrophobization and bioconjugation for enhanced siRNA delivery and targeting. RNA 13 (2007) 431-56; Gary D J, Puri N. Won Y Y, Polymer-based siRNA delivery: Perspectives on the fundamental and phenomenological distinctions from polymer-based DNA delivery, J Control Release 121 (2007) 64-73).

However, the nanoparticles formed by these complexes often lose stability easily depending on the storage environment, so they are vulnerable to long-term storage and there is a risk that the quality may be damaged during transportation. In addition, the nanoparticles is very difficult to manufacture because it requires a complicated manufacturing process to ensure sufficient stability.

Therefore, there is a demand for the development of a kit for preparing a nanoparticle composition for drug delivery that is not significantly affected by the storage environment and is easily used by the end consumer.

CONTENTS OF THE INVENTION

Problems to be Solved

The purpose of the present invention is to provide a kit for preparing a nanoparticle composition for drug delivery which is easily used by the end consumer because the nanoparticles containing the drug can be easily formed by simply mixing the kit components, and which can effectively deliver drugs into the body without being affected by the storage or transportation environment because the drug-containing nanoparticles can be easily formed immediately before use.

Technical Means to Solve the Problems

In order to achieve the technical purpose, the present invention provides a kit for preparing a nanoparticle composition, comprising a first chamber comprising an amphiphilic block copolymer and a cationic compound; and a second chamber comprising an active ingredient selected from a nucleic acid, a polypeptide, a virus or a combination thereof; and comprising neither poly lactic acid nor a salt of polylactic acid as kit components.

In one embodiment, the kit is for forming nanoparticles that deliver an intracellular active ingredient.

In one embodiment, at least one selected from the group consisting of the first chamber and the second chamber further comprises an additional solvent.

In one embodiment, the solvent is an aqueous solvent, a water-miscible solvent or a mixture thereof.

In one embodiment, the second chamber further comprises a pH adjusting agent, an inorganic salt, a saccharide, a surfactant, a chelating agent or a combination thereof.

Effects of the Invention

Since the kit for preparing a nanoparticle composition according to the present invention includes the components for forming the drug-containing nanoparticles in separate chambers, the nanoparticles are not affected by storage or transportation environments unlike the already formed nanoparticles. And by using the kit, the end user can successfully form nanoparticles having an effective drug delivery effect by simply mixing the components in the chamber.

BRIEF EXPLANATION OF THE DRAWINGS

FIG. 1 is a graph showing the experimental results for an intracellular delivery efficiency of nanoparticles performed in Experimental Example 2 of the present invention.

FIG. 2 is a graph showing the experimental results for the intracellular delivery efficiency of nanoparticles performed in Experimental Example 3 of the present invention.

MODES FOR THE INVENTION

Hereinafter, the present invention will be explained in detail.

A kit for preparing a nanoparticle composition of the present invention comprises a first chamber comprising an amphiphilic block copolymer and a cationic compound; and a second chamber comprising an active ingredient selected from a nucleic acid, a polypeptide, a virus or a combination thereof; and comprises neither polylactic acid nor a salt of polylactic acid as kit components.

The kit of the present invention may be for preparing nanoparticles by mixing immediately before administration. The kit of the present invention is composed of two or more chambers, and the end user can easily form nanoparticles by simply mixing the chambers. The term "simply mixing" may include all acts of "mixing," and means that no specific conditions are imposed on the act of mixing to form nanoparticles. The mixing may be accomplished by various methods such as dripping, vortexing, decanting and the like, but it is not limited thereto. In one embodiment, when using the kit of the present invention, 90% or more, 95% or more, or 99% or more of the theoretically formable amounts of nanoparticles can be formed rapidly—for example, within 1 minute, within 30 seconds, or within 15 seconds.

The kit of the present invention is characterized in that it does not contain any of polylactic acid and salt of polylactic acid. Polylactic acid or a salt thereof can be used to induce the effect of intracellular delivery of an intracellular active ingredient, but they have a disadvantage in that precipitation occurs easily during the mixing process. Therefore, they are not included in the kit of the present invention in which the end user must form nanoparticles by simply mixing.

The active ingredient in nanoparticles that is formed by end users' simply mixing may form a complex through electrostatic interaction with the cationic compound, and the complex may be entrapped in the nanoparticle structure formed by the amphiphilic block copolymer.

Regarding the above nanoparticles, in an aqueous environment, the hydrophilic portion of the amphiphilic block copolymer forms the outer wall of the nanoparticles, the hydrophobic portion of the amphiphilic block copolymer forms the inner wall of the nanoparticles, and the complex of the active ingredient and the cationic compound may be entrapped inside the formed nanoparticles. This nanoparticle structure improves the stability of the active ingredient in blood or body fluid.

The "nucleic acid" may be, for example, DNA, RNA, siRNA, shRNA, miRNA, mRNA, aptamer, antisense oligonucleotide or a combination thereof, but it is not limited thereto. The nucleic acid expresses an antigen through a series of processes in the body, and may encode an antigen. For example, the nucleic acid may be DNA, RNA or mRNA comprising a nucleotide sequence of an antigen or encoding such a polypeptide sequence.

The "polypeptide" may be one that can be recognized as an antigen. The polypeptide may refer to a protein that can be recognized as an antigen through a series of processes in the body, including the polypeptide sequence of an antigen, an analog or a precursor thereof.

The "virus" may be an oncolytic virus. For example, it may be one or more selected from the group consisting of adenovirus, vaccinia virus, herpes simplex virus (HSV) and vesicular stomatitis virus (VSV). In one embodiment, the oncolytic virus is an adenovirus. The adenovirus used in the embodiment of the present invention contains a luciferase gene, which can be confirmed through imaging.

The above virus can express several types of therapeutic genes in the body of an individual, and it is not limited to a specific molecular weight, protein, bioactivity or therapeutic field. The prophylactic virus can induce immunity in the body of a subject against a target disease. A composition comprising a virus for preventing diseases has advantages in that it can reduce the induction of immunity by the virus itself, designate or expand target cells, and reduce the hyperimmune response to the virus upon re-administration, so that a significant effect can be obtained by inoculation several times.

In one embodiment, the particle size of the nanoparticles may be defined as a Z-average value—for example, 800 nm or less. 600 nm or less, 500 nm or less, 400 nm or less, 300 nm or less, 200 nm or less or 150 nm or less, and may be 10 nm or more. In one embodiment, the particle size of the nanoparticles, defined as the Z-average value is, for example, 10 to 800 nm, 10 to 600 nm, 10 to 500 nm, 10 to 400 nm, 10 to 300 nm, 10 to 200 nm or 10 to 150 nm.

The "Z-average" may mean an average of hydrodynamic diameters of particle distributions measured using dynamic light scattering (DSL). The nanoparticles have a monodisperse particle distribution, and the polydispersity index may be, for example, 0.01 to 0.30, 0.05 to 0.25 or 0.1 to 0.2.

Also, in one embodiment, the surface charge of the nanoparticles may be, for example, −40 mV or more, −30 mV or more, −20 mV or more or −10 mV or more, and may be 40 mV or less, 30 mV or less, 20 mV or less or 10 mV or less. In one embodiment, the surface charge of the nanoparticles may be, for example, −40 to 40 mV, −30 to 30 mV, −20 to 20 mV or −10 to 10 mV. The surface charge may be measured in an environment close to a biological environment—for example, in 10 mM HEPES buffer (pH 7.2).

When the particle size and surface charge of the nanoparticles are maintained at the above levels, it is preferable in terms of stability of the nanoparticle structure, content of components, absorption in the body and ease of sterilizing as a pharmaceutical composition. For example, when the active ingredient is a nucleic acid, one or more terminals of the nucleic acid may be modified with one or more selected from the group consisting of cholesterol, tocopherol and fatty acids having 10 to 24 carbon atoms. The cholesterol, tocopherol and fatty acids having 10 to 24 carbon atoms include analogs, derivatives and metabolites of the cholesterol, the tocopherols and the fatty acids.

The content of the active ingredient may be, for example, 30 wt % or less, 25 wt % or less, 20 wt % or less, 15 wt % or less, 10 wt % or less or 5 wt % or less, and may be 0.001 wt % or more, 0.01 wt % or more, 0.05 wt % or more, 0.1 wt % or more, 0.25 wt % or more, 0.5 wt % or more or 1 wt % or more, based on the total weight of the composition formed by the kit of the present invention. In one embodiment, the content of the active ingredient may be, for example, 0.05 to 30 wt %. 0.1 to 25 wt %, 0.25 to 20 wt %, 0.5 to 15 wt %, 1 to 10 wt % or 1 to 5 wt %, based on the total weight of the composition. If the content of the active ingredient is less than the above range based on the weight of the total composition, the amount of the delivery systems used compared to the drug is too large, so there may be side effects due to the delivery systems. If to the content of the active ingredient exceeds the above range, the size of the nanoparticles is too large and the stability of nanoparticles is reduced, and there is a risk that the loss rate during filter sterilization may increase.

In one embodiment, when the active ingredient is a virus, the nanoparticles may include a virus $1\times10^6$ to $1\times10^{14}$ VP (Virus particle), $1\times10^7$ to $1\times10^{13}$ VP, $1\times10^8$ to $1\times10^{12}$ VP or $1\times10^9$ to $1\times10^{11}$ VP.

In one embodiment, when the active ingredient is a nucleic acid or a polypeptide, the amount of the nucleic acid or polypeptide contained in the nanoparticles is, for example, 5 ng to 150 µg, 10 ng to 100 µg, 10 ng to 50 µg, 10 ng to 10 µg, 10 ng to 500 ng, or 50 ng to 500 ng, but rt s not limited thereto.

In a specific embodiment, the cationic compound may be a cationic lipid or a cationic polymer, and more specifically a cationic lipid.

In one embodiment, the cationic lipid may be one or a combination of two or more selected from the group consisting of N,N-dioleyl-N,N-dimethylarrin numchloride (DODAC), N,N-distearyl-N,N-dimethylammoniumbromide (DDAB), N-(1-(2,3-dioleoyloxy)propy N,N,N-trimethylammoniumchloride (DOTAP), N,N-dimethyl-(2,3-dioleoyloxy)propylamine (DODMA), N,N,N-trimethyl-(2,3-dioleoyloxy)propylamine (DOTMA), 1,2-diacyl-3-trimethylammonium-propane (TAP), 1,2-diacyl-3-dimethylammonium-propane (DAP), 3β-[N-(N',N'N'-trimethylaminoethane)carbamoyl]cholesterol (TC-cholesterol), 3β-[N-(N',N'-dimethylaminoethane) carbamoyl]cholesterol (DC-cholesterol), 3β-[N-(N'-monomethylaminoethane)carbamoyl]cholesterol (MC-cholesterol), 3β-[N-(aminoethane)carbamoyl]cholesterol (AC-cholesterol), cholesteryloxypropane-1-amine (COPA), N-(N'-aminoethane)carbamoylpropanoic tocopherol (AC-tocopherol) and N-(N'-methylaminoethane)carbamoylpropanoic tocopherol (MC-tocopherol).

If such a cationic lipid is used, in order to decrease toxicity induced by cationic lipid, it may be preferable to use less polycationic lipid having high charge density, and more specifically, it is preferable to use a cationic lipid having one functional group capable of exhibiting positive charge per molecule in an aqueous solution.

Therefore, in a preferable embodiment, the cationic lipid may be at least one selected from the group consisting of 3β-[N-(N',N',N'-trimethylaminoethane)carbamoyl]cholesterol (TC-cholesterol), 3β-[N-(N',N'-dimethylaminoethane)carbamoyl]cholesterol (DC-cholesterol), 3β-[N-(N'-monomethylaminoethane)carbamoyl]cholesterol (MC-cholesterol), 3β-[N-(aminoethane)carbamoyl]cholesterol (AC-cholesterol), N-(1-(2,3-dioleoyloxy)propyl-N,N,N-trimethylammoniumchloride (DOTAP), N,N-dimethyl-(2,3-dioleoyloxy)propylamine (DODMA) and N,N,N-trimethyl-(2,3-dioleoyloxy)propylamine (DOTMA).

On the other hand, in one embodiment, the cationic polymer may be at least one selected from the group consisting of chitosan, glycol chitosan, protamine, polylysine, polyarginine, polyamidoamine (PAMAM), polyethylenimine, dextran, hyaluronic acid, albumin, polyethylenimine (PEI), polyamine and polyvinylamine (PVAm), and more specifically, may be at least one selected from polyethylenimine (PEI), polyamine and polyvinylamine (PVAm).

In one embodiment, the cationic lipid may be represented by the following Formula 1:

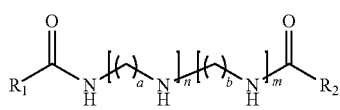

[Formula 1]

wherein each of n and m is 0 to 12 with the proviso that 2≤n+m≤12,
each of a and b is 1 to 6, and
each of $R_1$ and $R_2$ is independently selected from the group consisting of saturated and unsaturated hydrocarbons having 11 to 25 carbon atoms.

More specifically, in Formula 1, each of n and m may be independently 1 to 9, and 2≤n+m≤10.

More specifically, in Formula 1, each of a and b may be 2 to 4.

More specifically, each of $R_1$ and $R_2$ in Formula 1 may be independently selected from the group consisting of lauryl, myristyl, palmityl stearyl, arachidyl, behenyl, lignoceryl, cerotyl, myristoleyl, palmitoleyl, sapienyl, oleyl, linoleyl, arachidonyl, eicosapentaenyl, erucyl, docosahexaenyl and cerotyl.

In one embodiment, the cationic lipid may be one or more selected from the group consisting of 1,6-dioleoyl triethylenetetramide(N,N'-((ethane-1,2-diylbis(azanediyl))bis(ethane-2,1-diyl))dioleamide), 1,8-dilinoleoyl tetraethylenepentamide ((9Z,9'Z, 12Z, 12'Z)-N,N'-(((azanediylbis(ethane-2,1-diyl))bis(azanediyl)))bis(ethane-2,1-diyl)))bis(octadeca-9,12-dienamide)), 1,4-dimyristoleoyl diethylenetriamide ((9Z,9'Z)-N,N'-(azanediylbis(ethane-2,1-diyl))bis(tetradec-9-enamide)), 1,10-distearoyl pentaethylenehexamide (N,N'-(3,6,9,12-tetraazatetradecane-1,14-diyl)distearamide) and 1,10-dioleoyl pentaethylenehexamide (N,N'-(3,6,9,12-tetraazatetradecane-1,14-diyl)dioleamide).

The content of the cationic compound in the composition formed by the kit of the present invention may be, for example, 100 parts by weight or less, 90 parts by weight or less, 80 parts by weight or less, 70 parts by weight or less, 60 parts by weight or less, 50 parts by weight or less, 40 parts by weight or less, 30 parts by weight or less, 29 parts by weight or less, 28 parts by weight or less, 27 parts by weight or less, 26 parts by weight or less, 25 parts by weight or less, 24 parts by weight or less, 23 parts by weight or less, 22 parts by weight or less, 21 parts by, weight or less, 20 parts by weight or less, 19 parts by weight or less, 18 parts by weight or less, 17 parts by weight or less, 16 parts by weight or less, 15 parts by weight or less, 14 parts by weight less, 13 parts by weight or less, 12 parts by weight or less, 11 parts by weight or less, 10 parts by weight or less, 9 parts by weight or less, 8 parts by weight or less, 7 parts by weight or less, 6 parts by weight or less or 5 parts by weight or less, acid may be 0.1 parts by weight or more, 0.2 parts by weight or more, 0.3 parts by weight or more, 0.4 parts by weight or more, 0.5 parts by weight or more, 0.6 parts by weight or more, 0.7 parts by weight or more, 0.8 parts by weight or more, 0.9 parts by weight or more, 1 part by weight or more; 1.1 parts by weight or more, 1.2 parts by weight or more, 1.3 parts by weight or more, 1.4 parts by weight or more, 1.5 parts by weight or more, 1.6 parts by weight or more, 1.7 parts by weight or more, 1.8 parts by weight or more, 1.9 parts by weight or more, 2 parts by weight or more; 2.1 parts by weight or more, 2.2 parts by weight or more, 2.3 parts by weight or more, 2.4 parts by weight or more, 2.5 parts by weight or more, 2.6 parts by weight or more, 2.7 parts by weight or more, 2.8 parts by weight or more, 2.9 parts by weight or more, 3 parts by weight or more, 3.1 parts by weight or more, 3.2 parts by weight or more, 3.3 parts by weight or more, 3.4 parts by weight or more, 3.5 parts by weight or more, 3.6 parts by weight or more, 3.7 parts by weight or more, 3.8 parts by weight or more, 3.9 parts by weight or more or 4 parts by weight or more, but it is not limited thereto.

In one embodiment, the content of the cationic compound in the composition may be, 0.1 to 100 parts by weight, 0.5 to 50 parts by weight, 1 to 25 parts by weight, 1.5 to 10 parts by weight, 2 to 15 parts by weight, 2.5 to 10 parts by weight or 3 to 8 parts by weight, based on 1 part by weight of the active ingredient, but it is not limited thereto. If the content of the cationic compound in the composition is much less than the above level, it may not be possible to form a stable complex with the active ingredient. On the contrary, if the content of the cationic compound is much more than the above level, the size of the nanoparticles is too large, the stability is lowered, and there is a risk that the loss rate during filter sterilization may increase.

When the active ingredient is a nucleic acid, the cationic compound and the nucleic acid are combined by electrostatic interaction to form a complex. In one embodiment, the ratio of the amount of electric charge of the nucleic acid (P) and the cationic compound (N) (N/P; ratio of the cationic charge of the cationic compound to the anionic charge of the nucleic acid) may be 0.5 or more, 1 or more or 2 or more, and may be 100 or less, 50 or less or 20 or less—for example, 0.5 to 100, 1 to 50 or 2 to 20. If the ratio (N/P) is less than 0.5, it may be difficult to form a complex including a sufficient amount of nucleic acid, whereas if the ratio (N/P)

exceeds 100, there is a risk of causing toxicity. In addition, the N/P value may play an important role in the specific expression of the active ingredient in the spleen.

In one embodiment, the amphiphilic block copolymer may be an A-B type block copolymer including a hydrophilic A block and a hydrophobic B block. The A-B type block copolymer forms a core-shell type polymeric nanoparticle in an aqueous solution, wherein the hydrophobic B block forms a core (an inner wall) and the hydrophilic A block forms a shell (an outer wall).

In one embodiment, the hydrophilic A block may be at least one selected from the group consisting of polyalkyleneglycol, polyvinyl alcohol, poly vinyl pyrrolidone, polyacrylamide and derivatives thereof.

More specifically, the hydrophilic A block may be at least one selected from the group consisting of monomethoxy polyethylene glycol, monoacetoxy polyethylene glycol, polyethylene glycol, a copolymer of polyethylene and propylene glycol, and polyvinyl pyrrolidone.

In one embodiment, the hydrophilic A block may have a number average molecular weight of 200 to 50,000 Dalton, more specifically 1,000 to 20,000 Dalton, and much more specifically 1,000 to 5,000 Dalton.

If necessary, a functional group or a ligand that can reach to a specific tissue or cell, or a functional group capable of promoting intracellular delivery may be chemically conjugated to the terminal of the hydrophilic A block so as to control the distribution of the polymeric nanoparticle delivery system which is formed from the amphiphilic block copolymer and the salt of polylactic acid in a body, or to increase the efficiency of delivery of the nanoparticle delivery system into cells. In one embodiment, the functional group or ligand may be at least one selected from the group consisting of monosaccharide, polysaccharide, vitamins, peptides, proteins and an antibody to a cell surface receptor. In more specific examples, the functional group or ligand may be at least one selected from the group consisting of anisamide, vitamin B9 (folic acid), vitamin B12, vitamin A, galactose, lactose, mannose, hyaluronic acid, RGD peptide, NGR peptide, transferrin, an antibody to a transferrin receptor, etc.

The hydrophobic B block is a biocompatible and biodegradable polymer, and in one embodiment, it may be at least one selected from the group consisting of polyester, polyanhydride, polyamino acid, polyorthoester and polyphosphazine.

More specifically, the hydrophobic B block may be at least one selected from the group consisting of polylactide, polyglycolide, polycaprolactone, polydioxane-2-one, a copolymer of polylactide and glycolide, a copolymer of polylactide and polydioxane-2-one, a copolymer of polylactide and polycaprolactone, and a copolymer of polyglycolide and polycaprolactone.

In one embodiment, the hydrophobic B block may have a number average molecular weight of 50 to 50,000 Dalton, more specifically 200 to 20,000 Dalton, and much more specifically 1,000 to 5,000 Dalton.

And in one embodiment, in order to increase hydrophobicity of the hydrophobic B block for improving the stability of the nanoparticle, the hydrophobic block B may be modified by chemically bonding tocopherol, cholesterol or a fatty acid having 10 to 24 carbon atoms to a hydroxyl group at the terminal thereof.

In one embodiment, the content of the amphiphilic block copolymer including the hydrophilic block (A) and the hydrophobic block (B) in the composition formed by the kit of the present invention may be, for example, 200 parts by weight or less, 190 parts by weight or less, 180 parts by weight or less, 170 parts by weight or less, 160 parts by weight or less, 150 parts by weight or less, 140 parts by weight or less, 130 parts by weight or less. 120 parts by weight or less, 110 parts by weight or less; 100 parts by weight or less, 90 parts by weight or less, 80 parts by weight or less, 70 parts by weight or less, 60 parts by weight or less, 50 parts by weight or less, 40 parts by weight or less or 30 parts by weight or less, and may be 0.1 parts by weight or more, 0.5 parts by weight or more, 1 part by weight or more, 1.5 parts by weight or more, 2 parts by weight or more, 2.5 parts by weight or more, 3 parts by weight or more, 3.5 parts by weight or more, 4 parts by weight or more, 4.5 parts by weight or more, 5 parts by weight or more, 5.5 parts by weight or more, 6 parts by weight or more, 6.5 parts by weight or more, 7 parts by weight or more, 7.5 parts by weight or more, 8 parts by weight or more, 8.5 parts by weight or more, 9 parts by weight or more, 9.5 parts by weight or more, 10 parts by weight or more, 10.5 parts by weight more, 11 parts by weight or more, 11.5 parts by weight or more, 12 parts by weight or more, 12.5 parts by weight or more, 13 parts by weight or more, 13.5 parts by weight or more. 14 parts by weight or more, 14.5 parts by weight or more, 15 parts by weight or more, 15.5 parts by weight or more, 16 parts by weight or more, 16.5 parts by weight or more, 17 parts by weight or more, 17.5 parts by weight or more, 18 parts by weight or more, 18.5 parts by weight or more, 19 parts by weight or more, 19.5 parts by weight or more or 20 parts by weight or more, but it is not limited thereto.

For example, the content of the amphiphilic block copolymer in the composition may be 0.1 to 200 parts by weight, 0.5 to 180 parts by weight, 1 to 150 parts by weight, 10 to 100 parts by weight, 10 to 70 parts by weight, 15 to 50 parts by weight or 15 to 30 parts by weight, based on 1 part by weight of the active ingredient, but it is not limited thereto. If the content of the amphiphilic block copolymer in the composition is much less than the above level, the size of the nanoparticles becomes too large, the stability of the nanoparticles is reduced, and there is a risk that the loss rate during filter sterilization may increase. Conversely, if the content of the amphiphilic block copolymer is much more than the above level, the content of the active ingredient that can be incorporated is too small.

In one embodiment, regarding the ratio of the hydrophilic block (A) and the hydrophobic block (B) in the amphiphilic block copolymer, the ratio of the hydrophilic block (A) may be 40 to 70 wt %, and specifically 50 to 60 wt %, based on total weight of the copolymer. If the ratio of the hydrophilic block (A) is less than 40 wt %, solubility of the polymer in water is low, and thus it may be difficult to form a nanoparticle. Therefore, the ratio of the hydrophilic block (A) is preferably no less than 40 wt % to give sufficient water solubility for the copolymer to form a nanoparticle. If the ratio of the hydrophilic block (A) exceeds 70 wt % based on total weight of the copolymer, hydrophilicity may be too high and thus stability of the polymeric nanoparticle may become too low, and it may be difficult to use it as a solubilizing composition of the active ingredient/cationic compound complex. Therefore, in light of the stability of the nanoparticle, the ratio of the hydrophilic block (A) is preferably no more than 70 wt %.

In one embodiment, the amphiphilic block copolymer allows enclosure of the complex of the active ingredient and the cationic compound in the nanoparticle structure in an aqueous solution, wherein the ratio of the weight of the complex of the active ingredient and the cationic compound (a) to the weight of the amphiphilic block copolymer (b) [a/b×100; (the weight of the active ingredient+the weight of the cationic compound)/the weight of the amphiphilic block copolymer×100] may be 1 to 60%, more specifically 1.5 to 50%, and even more specifically 2 to 40%. If the weight ratio (a/b×100) is less than 1%, the content of the complex of the active ingredient and the cationic compound may become too low, and thus it may be difficult to meet the effective content that the active ingredient can effectively act on. If it exceeds 60%, a nanoparticle structure of appropriate size may not be formed considering the molecular weight of the amphiphilic block copolymer and the amount of the complex of the active ingredient and the cationic compound.

In one embodiment, the weight of the cationic compound in the kit may be 1 µg or more, 5 µg or more, 10 µg or more, 15 µg or more or 18 µg or more, and may be 200 µg or less, 150 µg or less, 120 µg or less, 100 µg or less, 80 µg or less, 50 µg or less, 30 µg or less or 25 µg or less—for example, 1 µg to 200 µg, 5 µg to 100 µg, 5 µg to 80 µg or 15 µg to 25 µg, but it is not limited thereto.

In one embodiment, the weight of the amphiphilic block copolymer in the kit may be 10 µg or more, 20 µg or more, 25 µg or more, 50 µg or more, 80 µg or more, 100 µg or more or 120 µg or more, and may be 500 µg or less, 400 µg or less, 350 µg or less, 300 µg or less or 250 µg or less—for example, 10 µg to 500 µg, 20 µg to 300 µg, 25 µg to 250 µg or 120 µg to 250 µg, but it is not limited thereto.

In addition, in one embodiment, the amphiphilic block copolymer may be included in the kit in an amount of less than 40 parts by weight, for example, 1 to 35 parts by weight, 1 to 30 parts by weight, 1 to 25 parts by weight, 1 to 20 parts by weight, 1 to 15 parts by weight, 1 to 10 parts by weight, 1 to 5 parts by weight, 5 to 40 parts by weight, 5 to 35 parts by weight, 5 to 30 parts by weight, 5 to 25 parts by weight, 5 to 20 parts by weight, or 5 to 15 parts by weight, etc. based on 1 part by weight of the cationic compound, but it is not limited thereto.

In one embodiment, the first chamber and/or the second chamber may further comprise an aqueous solution, a water-miscible organic solvent or a combination thereof. The "aqueous solution" may refer to, for example, water, sterile purified water, buffer solution, injection solution, etc., and may be a buffer solution further containing an organic acid. The aqueous solution may be, for example, a citric acid buffer, a PBS buffer and the like, but it is not limited thereto. The "water-miscible organic solvent" may be a C1 to C4 lower alcohol, acetone, acetonitrile, a water mixture thereof or a mixture thereof, but it is not limited thereto.

In one embodiment, the amphiphilic block copolymer and the cationic compound may be comprised in an emulsion state in the first chamber. In this case, the solvent is a mixture of a water-miscible organic solvent and an aqueous solution, and, for example, acetate such as sodium acetate or ethanol may be mixed with 20 to 30 times more water than ethanol.

In one embodiment, the second chamber may further comprise a stabilizer suitable for improving the stability of the active ingredient. The stabilizer may further comprise a pH adjuster, an inorganic salt, a saccharide, a surfactant, a chelating agent, and the like, but it is not limited thereto. The "saccharide" may refer to monosaccharides, disaccharides, sugar alcohols that are reducing sugars thereof, polymers of single or mixed polysaccharides and the like, and the polysaccharides may refer to trisaccharides or more. The monosaccharides include, for example, mannose, glucose, arabinose, fructose, galactose, and the like; the disaccharides include sucrose, trehalose, maltose, lactose, cellobiose, gentiobiose, isomaltose, melibose, and the like; the sugar alcohols include mannitol, sorbitol, xylitol, erythritol, maltitol, and the like; the polysaccharides include raffinose, dextran, starch, hydroxyethyl starch, cyclodextrin, cellulose, hetastarch, and oligosaccharide, but they are not limited thereto. The "pH regulator" may be Tris, glycine, histidine, glutamate, succinate, phosphate, acetate, aspartate, or a combination thereof, and the "surfactant" is sodium lauryl sulfate, dioctyl sodium sulfosuccinate, dioctyl sodium sulfonate, chenodeoxycholic acid, N-lauroyl sarcosine sodium salt, lithium dodecyl sulfate, 1-octane sulfonic acid sodium salt, sodium cholate hydrate, sodium deoxycholate, glycodeoxycholic acid sodium salt, benzalkonium chloride, Triton X-100, Triton X-114, lauromacrogol 400, polyoxyl 40 stearate, polysorbate 20, 40, 60, 65 and 80, or a combination thereof, but they are not limited thereto. The "chelating agent" may be citric acid, polyphenolic acid, EDTA, DTPA, EDDHA, or a combination thereof, but it is not limited thereto. The "inorganic salt" refers to a salt of a monovalent or divalent metal, and may be NaCl, KCl, $MgCl_2$, $CaCl_2$, $MgSO_4$, $CaSO_4$, $CaCO_3$, $MgCO_3$, etc., but it is not limited thereto.

For example, when the active ingredient is a virus, the second chamber may further comprise 5 to 15 mM Tris, 5 to 15 mM histidine, 50 to 90 mM NaCl, 2 to 8% sucrose (w/v), 0.5 to 1.5 mM $MgCl_2$, 0.005 to 0.05% (w/v) PS-80, 0.05 to 0.15 mM EDTA and 0.1 to 1.0% ethanol (v/v), and the pH may be 7.0 to 8.0.

The "chamber" is suitable for containing the material of nanoparticles or a solvent containing the same, and includes glass, plastic, paper, pack, etc., but it is not limited thereto.

DETAILED DESCRIPTION TO CARRY OUT THE INVENTION

Hereinafter, the present invention will be explained in detail with reference to the following Examples. However, these Examples are only meant to illustrate the invention and its scope, and are not limited thereto in any manner.

Preparation Example 1: Formation of Nanoparticles Containing Virus (1) Preparation of First Chamber Composition Each of 20 mg of 1,6-dioleoyl triethylenetetramide (dioTETA) and 50 mg of mPEG-PLA-tocopherol was dissolved in 1 ml of 90% ethanol. After mixing dioTETA and mPEG-PLA-tocopherol in the ratio shown in Table 1 below, 30 times PBS was mixed to prepare a complex emulsion. The prepared composition was filtered through a 0.22 µm hydrophilic filter (see Table 1).

TABLE 1

| First chamber composition | Ratio | dioTETA | mPEG-PLA-tocopherol |
|---|---|---|---|
| Example 1 | 5/50 | 5 µg | 50 µg |
| Example 2 | 10/50 | 10 µg | 50 µg |
| Example 3 | 20/50 | 20 µg | 50 µg |
| Example 4 | 40/50 | 40 µg | 50 µg |
| Example 5 | 80/50 | 80 µg | 50 µg |
| Example 6 | 5/100 | 5 µg | 100 g |
| Example 7 | 10/100 | 10 µg | 100 µg |
| Example 8 | 20/100 | 20 µg | 100 µg |
| Example 9 | 40/100 | 40 µg | 100 µg |
| Example 10 | 80/100 | 80 µg | 100 µg |
| Example 11 | 5/200 | 5 µg | 200 µg |
| Example 12 | 10/200 | 10 µg | 200 µg |
| Example 13 | 20/200 | 20 µg | 200 µg |

TABLE 1-continued

| First chamber composition | Ratio | dioTETA | mPEG-PLA-tocopherol |
|---|---|---|---|
| Example 14 | 40/200 | 40 μg | 200 μg |
| Example 15 | 80/200 | 80 μg | 200 μg |
| Example 16 | 10/400 | 10 μg | 400 μg |
| Example 17 | 20/400 | 20 μg | 400 μg |
| Example 18 | 40/400 | 40 μg | 400 μg |
| Example 19 | 80/400 | 80 μg | 400 μg |

(2) Preparation of Second Chamber Composition Containing Oncolytic Virus

VQAd CMV Luc virus (ViraQuest, Lot #: 33088) dispensed in A195 buffer (10 mM Tris, 10 mM histidine, 75 mM NaCl, 5% sucrose (w/v), 1 mM $MgCl_2$, 0.02% (w/v) PS-80, 0.1 mM EDTA, 0.5% ethanol (v/v), pH 7.4) was counted to $1\times10^{10}$ VP and prepared.

(3) Preparation of Nanoparticles

Nanoparticles were formed by mixing the first chamber composition and the second chamber composition by vortexing for 10 to 15 seconds immediately before use.

Experimental Example 1

Confirmation of the Formation of Nanoparticles

Testing was done to confirm whether the nanoparticles of Examples 1 to 19 were normally formed by mixing the first chamber composition and the second chamber composition immediately before use.

As a result, in all of Examples 1 to 19, no precipitate was observed even with simple mixing, and it was confirmed that nanoparticles were normally formed.

Experimental Example 2

Confirmation of Intracellular Delivery Efficiency of Nanoparticles Containing Oncolytic Virus In order to evaluate the intracellular delivery efficiency nanoparticles, MDA-MB435 cells with low CAR expression suitable for evaluating the virus delivery efficiency were prepared. Nanoparticles of Examples 1 to 3, 6 to 8 and 11 to 13 were formed by mixing the first chamber composition and the second chamber composition immediately before intracellular injection, and the cells were dispensed in an amount corresponding to 500 moi based on the virus. After further incubation for 15 to 24 hours, luciferin was added to the cells to measure the amount of luciferase expressed. As a control, a virus (naked Ad; Ad), not nanoparticles, was used. The results are shown in FIG. 1.

Preparation Example 2

Formation of Nanoparticles Containing mRNA (1) Preparation of First Chamber Composition 20 mg of dioTETA was dissolved in 20 mM sodium acetate, and 50 mg of mPEG-PLA-tocopherol was dissolved in purified water. When using a salt of polylactic acid, it was dissolved in purified water together with mPEG-PLA-tocopherol.

After mixing dioTETA, mPEG-PLA-tocopherol and polylactate in the ratio shown in Table 2 below, PBS was mixed to prepare a complex emulsion, and the prepared composition was filtered through a 0.22 μm hydrophilic filter.

TABLE 2

| First chamber composition | dioTETA | mPEG-PLA-tocopherol | Salt of polylactic acid |
|---|---|---|---|
| Example 20 | 15 μg | 24.7 μg | 0 |
| Comparative Example 1 | 15 μg | 24.7 μg | 76.4 μg |
| Comparative Example 2 | 15 μg | 24.7 μg | 152.8 μg |
| Comparative Example 3 | 15 μg | 24.7 μg | 305.6 μg |

(2) Preparation of Second Chamber Composition Containing mRNA

Luciferase mRNA was mixed with purified water and mixed. mRNA was used in a concentration of 5 μg when preparing nanoparticles.

(3) Preparation of Nanoparticles

Nanoparticles were formed by mixing the first chamber composition and the second chamber composition by vortexing for 10 to 15 seconds immediately before use.

Experimental Example 3

Confirmation of Intracellular Delivery Efficiency of Nanoparticles Containing mRNA In order to evaluate the intracellular delivery efficiency of nanoparticles compared to that in the presence of a salt of polylactic acid, HepG2 cells were prepared. Nanoparticles of Example 20 and Comparative Examples 1 to 3 were formed by mixing the first chamber composition and the second chamber composition immediately before intracellular injection, and mRNA was dispensed into cells in an amount corresponding to 250 ng. After further incubation for 15 to 24 hours, luciferin was added to the cells to measure the amount of luciferase expressed. TransIT (Takara), a commonly used transfection reagent, was employed as a control. The results are shown in FIG. 2.

The invention claimed is:

1. A kit for preparing a nanoparticle composition, comprising
    a first chamber comprising an amphiphilic block copolymer and a cationic compound; and
    a second chamber comprising an active ingredient selected from a nucleic acid, a polypeptide, a virus or a combination thereof, and
    comprising neither polylactic acid nor a salt of polylactic acid as kit components,
    wherein 90% or more of theoretically formable amount of nanoparticles is capable of being formed within 1 minute of mixing the components of said first chamber and said second chamber, and
    wherein the amphiphilic block copolymer is comprised in the kit in an amount of less than 40 parts by weight, based on 1 part by weight of the cationic compound.

2. The kit for preparing a nanoparticle composition according to claim 1, for forming nanoparticles that deliver an intracellular active ingredient.

3. The kit for preparing a nanoparticle composition according to claim 1, wherein at least one selected from the group consisting of the first chamber and the second chamber further comprises a solvent.

4. The kit for preparing a nanoparticle composition according to claim 3, wherein the solvent is an aqueous solvent, a water-miscible solvent or a mixture thereof.

5. The kit for preparing a nanoparticle composition according to claim 1, wherein the second chamber further comprises a pH adjusting agent, an inorganic salt, a saccharide, a surfactant, a chelating agent or a combination thereof.

* * * * *